(12) United States Patent
Ishioka (10) Patent No.: US 8,456,477 B2
(45) Date of Patent: Jun. 4, 2013

(54) INFORMATION PROCESSING APPARATUS, INFORMATION PROCESSING METHOD AND PROGRAM FOR GENERATING AND DISPLAYING NETWORK STRUCTURES

(75) Inventor: Takuya Ishioka, Tokyo (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 12/464,558

(22) Filed: May 12, 2009

(65) Prior Publication Data

US 2009/0284531 A1 Nov. 19, 2009

(30) Foreign Application Priority Data

May 19, 2008 (JP) ................ P2008-131253

(51) Int. Cl.
*G06F 15/00* (2006.01)
*G06F 3/00* (2006.01)
*G06T 1/00* (2006.01)

(52) U.S. Cl.
USPC .......................... 345/501; 715/733

(58) Field of Classification Search
USPC .......................... 345/501; 715/733
See application file for complete search history.

(56) References Cited

U.S. PATENT DOCUMENTS

| 2006/0106847 | A1* | 5/2006 | Eckardt et al. | ............... | 707/101 |
| 2007/0156636 | A1* | 7/2007 | Norton et al. | ............... | 707/1 |

FOREIGN PATENT DOCUMENTS

| JP | 2004-348179 | 12/2004 |
| JP | 2007-52557 | 1/2007 |
| JP | 2007-193380 | 2/2007 |
| JP | 2008-052494 | 6/2008 |
| JP | 2008-052495 | 6/2008 |

OTHER PUBLICATIONS

Notification of Reasons for Refusal, issued Mar. 9, 2010 with English language translation from the Japanese Patent Office in corresponding Japanese Patent application No. 2008-131253.
Okubo, R. et al., "Infrastructure Technologies, Visualization of the Relation Between Communities Suggestion of Focus Graph" NEC Technical Report, vol. 61, No. 2, pp. 57-60 (2008).
Nanjyo, N. et al., "Network Science Battle Front-Science and Thought to Know Connection" World-No. 18, Innovation Emergence Network, Mathematics Science, Science Corporation Co., Ltd., vol. 46, No. 3, pp. 78-83 (2008).
Inoue, a., et al., "Gene Medicine Information of a Genome Net," Gene Medicine, Medical do, Co., Ltd., vol. 4, No. 3, pp. 16-23 (2000).

* cited by examiner

*Primary Examiner* — Jacinta M Crawford
(74) *Attorney, Agent, or Firm* — Finnegan, Henderson, Farabow, Garrett & Dunner, L.L.P.

(57) ABSTRACT

An information processing apparatus includes a network structure generation unit that generates a network structure showing relations formed between registered users at a predetermined time based on user information containing attribute information showing attributes of the registered user registered with a social networking service (SNS) and registration time information showing a registration time of the registered user, and relation information containing relation formation information showing a relation formed between the registered users on the SNS, and relation formation time information showing a relation formation time, a network image generation unit that generates a network image representing the generated network structure with the registered user as a node and a relation formed between the registered users as an edge, and a network image display unit that chronologically displays the generated network images at a plurality of the predetermined times. Accordingly, a change of SNS operation conditions can efficiently be grasped.

9 Claims, 12 Drawing Sheets

PRIMARY DATA

| USER ID | USER NAME | ・・・ | REGISTRATION DATE/TIME | ・・・ |
|---|---|---|---|---|
| 9 | III | | 2007/7/27 17:51 | |
| 3 | CCC | | 2007/7/27 18:18 | |
| 4 | DDD | | 2007/7/27 19:51 | |
| 5 | EEE | | 2007/7/31 10:06 | |
| 6 | FFF | ・・・ | 2007/8/1 12:09 | ・・・ |
| 7 | GGG | | 2007/8/1 15:15 | |
| 8 | HHH | | 2007/8/1 17:58 | |
| 2 | BBB | | 2007/8/4 13:16 | |
| 10 | JJJ | | 2007/8/8 13:56 | |
| 1 | AAA | | 2007/8/9 17:02 | |

| FROM | TO | ・・・ | LINK ESTABLISHMENT DATE/TIME |
|---|---|---|---|
| 3 | 8 | | 2007-07-27 18:18:14 |
| 8 | 3 | | 2007-07-27 18:18:14 |
| 4 | 8 | | 2007-07-27 19:51:24 |
| 8 | 4 | | 2007-07-27 19:51:24 |
| 3 | 4 | ・・・ | 2007-07-28 16:10:05 |
| 4 | 3 | | 2007-07-28 16:10:05 |
| 5 | 3 | | 2007-07-31 10:06:41 |
| 3 | 5 | | 2007-07-31 10:06:41 |
| 8 | 5 | | 2007-08-01 09:28:32 |
| 5 | 8 | | 2007-08-01 09:28:32 |

FIG.4B

SECONDARY DATA

| USER ID | REGISTRATION DATE/TIME | · · · | NUMBER OF LINKS |
|---|---|---|---|
| 9 | 2007/7/27 17:51 | | 5 |
| 3 | 2007/7/27 18:18 | | 3 |
| 4 | 2007/7/27 19:51 | | 136 |
| 5 | 2007/7/31 10:06 | | 12 |
| 6 | 2007/8/1 12:09 | | 1 |
| 7 | 2007/8/1 15:15 | · · · | 7 |
| 8 | 2007/8/1 17:58 | | 2 |
| 2 | 2007/8/4 13:16 | | 2 |
| 10 | 2007/8/8 13:56 | | 27 |
| 1 | 2007/8/9 17:02 | | 83 |

⋮

| FROM | TO | · · · | LINK ESTABLISHMENT DATE/TIME |
|---|---|---|---|
| 3 | 8 | | 2007-07-27 18:18:14 |
| 4 | 8 | | 2007-07-27 19:51:24 |
| 3 | 4 | · · · | 2007-07-28 16:10:05 |
| 5 | 3 | | 2007-07-31 10:06:41 |
| 8 | 5 | | 2007-08-01 09:28:32 |

INFORMATION PROCESSING APPARATUS, INFORMATION PROCESSING METHOD AND PROGRAM FOR GENERATING AND DISPLAYING NETWORK STRUCTURES

BACKGROUND OF THE INVENTION

1. Field of the Invention

The present invention relates to an information processing apparatus, an information processing method, and a program.

2. Description of the Related Art

A social networking service (SNS) is known as a service that constructs a social network on the Internet. SNSs, which adopt person-to-person communication as a main objective, provide a place of information exchange to promote communication between friends or acquaintances and to construct new human relations through connection to others having no direct relations.

SNSs are generally provided on Web sites of the Internet using information server systems of various scales by service providers such as various operators, organizations, and individuals. In order to provide appropriate services, service providers maintain and manage systems in accordance with operation conditions of services that constantly change such as the number of registered users, relations formed between registered users, and the amount of information transmitted and received between registered users. Systems are maintained and managed through updates and reconstruction after changes of service operation conditions being grasped and analyzed, or a new service may be newly constructed after changes of operation conditions of other services being grasped and analyzed. Thus, it is important for service providers or system developers to accurately grasp and efficiently analyze SNS operation conditions that constantly change.

Here, since an SNS is a service realized by registered users and relations between registered users, operation conditions thereof can be represented as a mesh-type network structure in which a registered user is represented as a node and a relation between registered users as an edge. Thus, operation conditions of an SNS can suitably be grasped through representations (visualization) in a network structure.

On the other hand, tools to represent (visualize) a network structure are described, for example, in Non-Patent Documents 1 to 4 shown below as related art. Patent Document 1 shown below describes a technology to determine human relations among a plurality of users from public information to create human relation data. In addition, for example, a network analysis technique to conduct a statistical analysis of chronological changes of parameters representing a network structure is known.

[Non-Patent Document 1] "Program for Large Network Analysis", Networks/Pajek [searched on Apr. 10, 2008], [online], Internet <URL: http://vlado.fmf.uni-lj.si/pub/networks/pajek/>

[Non-Patent Document 2] "Cytoscape", cytoscape [searched on Apr. 10, 2008], [online], Internet <URL:http://www.cytoscape.org/>

[Non-Patent Document 3] "Large Graph Layout", Alex Adai [searched on Apr. 10, 2008], [online], Internet <URL: http://apropos.icmb.utexas.edu/lgl/>

[Non-Patent Document 4] "Graph Viz" [searched on Apr. 10, 2008], [online], Internet <URL:http://www.graphviz.org/About.php>

[Patent Document 1] Japanese Patent Application Laid-Open No. 2004-348179

SUMMARY OF THE INVENTION

However, tools described in Non-Patent Documents 1 to 4 and technology described in Patent Document 1 can display a network structure at a specific time, but can hardly display chronological changes thereof. By using techniques based on statistical analysis, a trend of chronological changes of a network structure can be grasped in broad outline, but a local trend of changes can hardly be grasped. Thus, there is an issue that a change of SNS operation conditions can be hardly grasped accurately in related art.

It is desirable to provide an information processing apparatus, an information processing method, and a program available to grasp a change of SNS operation conditions.

According to a first embodiment of the present invention, there is provided an information processing apparatus, including a network structure generation unit that generates a network structure showing relations formed between registered users at a predetermined time based on user information containing attribute information showing attributes of the registered user registered with a social networking service (SNS) and registration time information showing a registration time of the registered user, and relation information containing relation formation information showing a relation formed between the registered users on the SNS and relation formation time information showing a relation formation time, a network image generation unit that generates a network image representing the generated network structure with the registered user as a node and a relation formed between the registered users as an edge, and a network image display unit that chronologically displays the generated network images at a plurality of the predetermined times.

According to such a configuration, a network structure showing relations formed between registered users at a plurality of predetermined times is generated based on user information containing registration time information and relation information containing relation formation time information. Then, network images representing the generated network structure with a registered user as a node and a relation formed between registered users as an edge are chronologically displayed. Accordingly, a change of SNS operation conditions can accurately be grasped through the chronologically displayed network images.

The information processing apparatus may further include a display mode selection unit for selecting a display mode of the network image, wherein the network image generation unit generates a network image corresponding to a total display mode in which all registered users contained in the generated network structure and relations formed between all the registered users are displayed or a local display mode in which a specific registered user and relations formed by the specific registered user are displayed in accordance with a selection of the display mode and the network image display unit displays the generated network image. Accordingly, a change of SNS operation conditions can efficiently be grasped by selecting the display mode according to purpose to display the network image showing a change of the network structure as a whole or locally.

The network image generation unit may generate a network image corresponding to both the total display mode and the local display mode, and the network image display unit may simultaneously display both the generated network images. Accordingly, a change of SNS operation conditions can efficiently be grasped by displaying the network images showing a change of the network structure as a whole and locally simultaneously.

The information processing apparatus may further include a node/edge selection unit for selecting a node or an edge on the network image displayed in the total display mode, wherein the network image generation unit generates, when an node is selected, a network image containing attribute information of a registered user corresponding to the selected node and, when an edge is selected, a network image containing relation information of a relation corresponding to the selected edge and attribute information of each registered user corresponding to nodes arranged at both ends of the selected edge, and the network image display unit displays the generated network image. Accordingly, information to grasp a change of SNS operation conditions can efficiently be acquired by selecting a node or an edge on the network image.

The information processing apparatus may further include a node/edge selection unit for selecting a node or an edge on the network image displayed in the local display mode, wherein the network image generation unit generates a network image containing attribute information of a registered user corresponding to a node together with the node and, when the node is selected, generates a network image containing edges showing relations formed between the registered user corresponding to the selected node and other registered users and nodes showing the other registered users, the edges and nodes being non-displayed and the network image display unit displays the generated network image. Accordingly, information to grasp a change of SNS operation conditions can efficiently be acquired by selecting a node or an edge on the network image.

The information processing apparatus may further include a period designation unit for designating a predetermined period from a first time to a second time, wherein the network structure generation unit generates a network structure showing relations formed between registered users in the predetermined period, the network image generation unit generates a network image representing the generated network structure, and the network image display unit displays the generated network image. Accordingly, a change of SNS operation conditions can accurately be grasped by displaying the network image showing a change of the network structure in a predetermined period.

The network image generation unit may change display attributes of a node corresponding to a registered user and edges based on user information and relation information corresponding to the registered user. Accordingly, a change of SNS operation conditions can accurately be grasped by changing display attributes of nodes and edges based on user information and relation information.

Network images representing network structures showing relations formed between registered users of each of a plurality of SNS may simultaneously be displayed. Accordingly, changes of SNS operation conditions can efficiently be compared through network images chronologically displayed for the plurality of SNS.

According to a second embodiment of the present invention, there is provided an information processing method, including the steps of: generating a network structure showing relations formed between registered users at a predetermined time based on user information containing attribute information showing attributes of the registered user registered with a social networking service (SNS) and registration time information showing a registration time of the registered user, and relation information containing relation formation information showing a relation formed between the registered users on the SNS and relation formation time information showing a relation formation time, generating a network image representing the generated network structure with the registered user as a node and a relation formed between the registered users as an edge, and displaying chronologically the generated network images at a plurality of the predetermined times.

According to such a method, a change of SNS operation conditions can accurately be grasped through the chronologically displayed network images.

According to a third embodiment of the present invention, there is provided a program to cause a computer to execute the information processing method according to the second embodiment described above.

According to the embodiments of the present invention, an information processing apparatus, an information processing method, and a program available to grasp a change of SNS operation conditions can be provided.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

Figure 1:
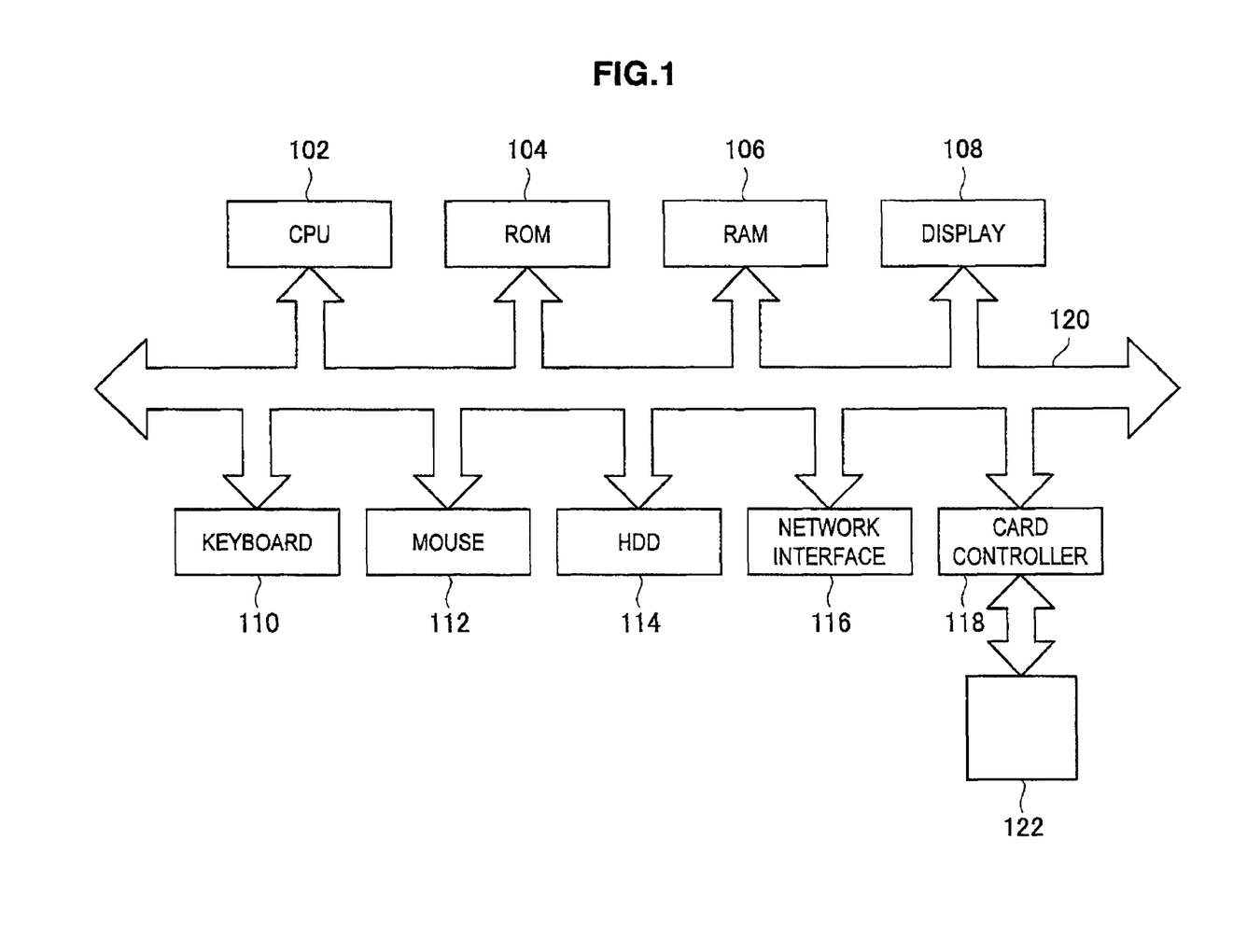
FIG. 1 is a block diagram showing a terminal system according to an embodiment of the present invention.

FIG. 1 is a block diagram showing a terminal system according to an embodiment of the present invention. The terminal system (information processing apparatus) is a computer system to display an image representing a network structure showing SNS operation conditions by executing a processing program to execute an information processing method described later. The terminal system includes components such as a CPU 102, a ROM 104, a RAM 106, a display 108, a keyboard 110, a mouse 112, a hard disk drive (HDD) 114, a network interface 116, and a card controller 118 and each component is connected by a bus 120. Incidentally, the terminal system may include a touch screen or the like as an input/output device.

The CPU 102 executes the information processing method described later by executing a processing program stored in the RAM 106 and controls the RAM 106, the display 108, the hard disk drive 114, the card controller 118 and the like via a device controller (not shown). The ROM 104 is a nonvolatile memory in which a control program necessary for the CPU 102 to operate and data are stored in advance. The RAM 106 is a memory in which various programs and data are temporarily stored. The hard disk drive 114 is a nonvolatile memory in which an operating system and processing programs are stored. The network interface 116 includes, for example, a modem, a network interface card or the like. The card controller 118 controls storage/reproduction of data in a removable memory 122.

On the other hand, an SNS server system (hereinafter, referred to as an SNS system) is a system for providing a SNS on a Web site. The SNS system manages operation data necessary for SNS operations in log format containing point of execution of processing and processing content as a database or the like. Here, the operation data is such as user information of registered users registered with the SNS and relation information formed between registered users. The processing is various kinds of processing such as user registration processing and relation formation processing between registered users.

The terminal system acquires operation data from the SNS system via, for example, the network interface 116, the removable memory 122 or the like, processes the operation data using a processing program described later, and displays an image representing a network structure showing SNS operation conditions on a display device such as a display 108 or a projector.

Though details will be described later, the CPU 102 functions as a network structure generation unit that generates a network structure showing relations formed between registered users at a predetermined time based on user information of registered users and relation information formed between registered users. The CPU 102 functions also as a network image generation unit that generates a network image representing a network structure using a registered user as a node and a relation formed between registered users as an edge and a network image display unit that causes a display device to chronologically display network images generated at a plurality of predetermined times.

Each component of the network structure generation unit, network image generation unit, and network image display unit may be realized by a processing program to execute the function of each component being installed in the RAM 106 or by dedicated hardware. A processing program may be stored in a computer readable storage medium such as the removable memory 122 to be read for execution when necessary or acquired via the network interface 116.

The input device such as the keyboard 110 and the mouse functions as a display mode selection unit to select the display mode of a network image, a node/edge selection unit to select a node or edge on a displayed network image, and a period designation unit to designate a predetermined time or a predetermined period.

Figure 2A:
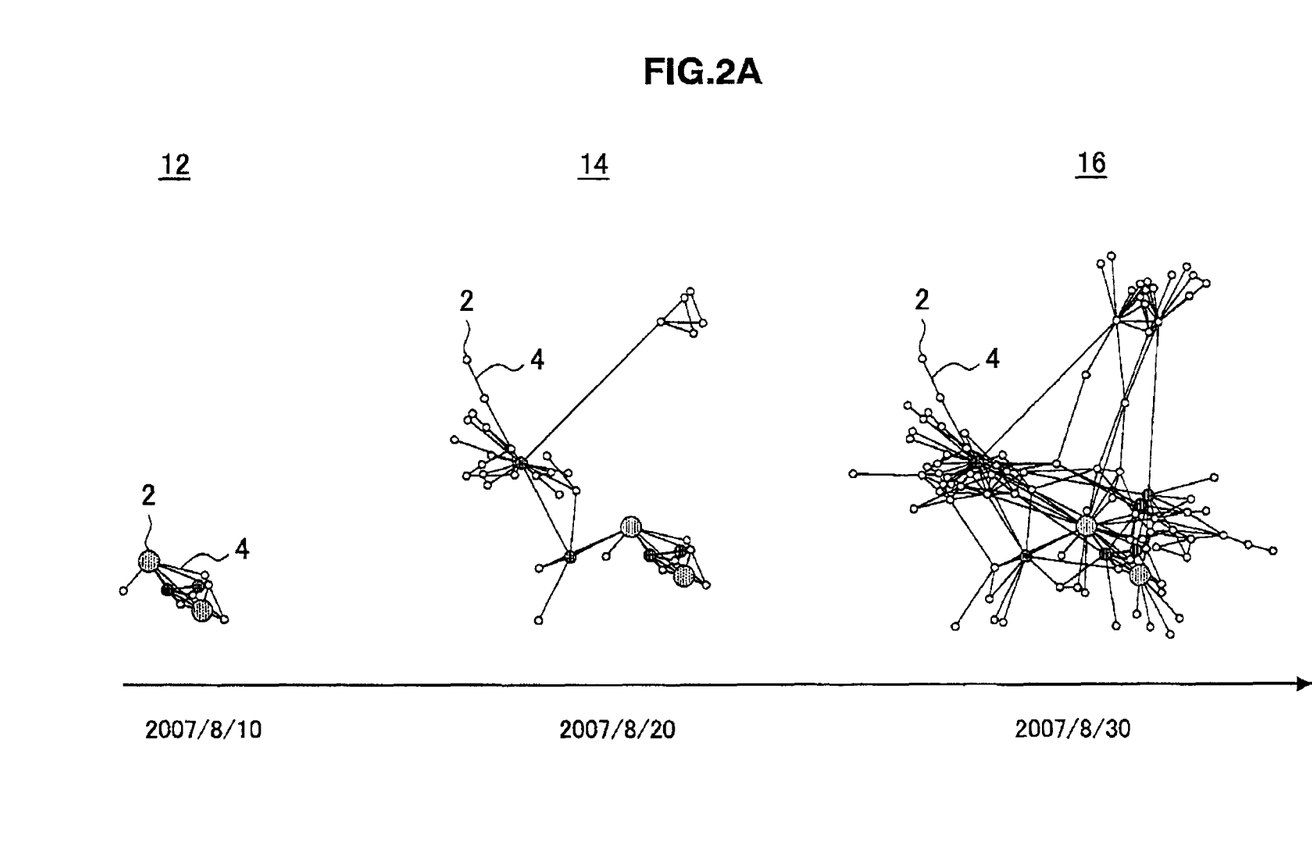
FIG. 2A is an explanatory view exemplifying images of a network structure showing a change of SNS operation conditions.
Figure 2B:
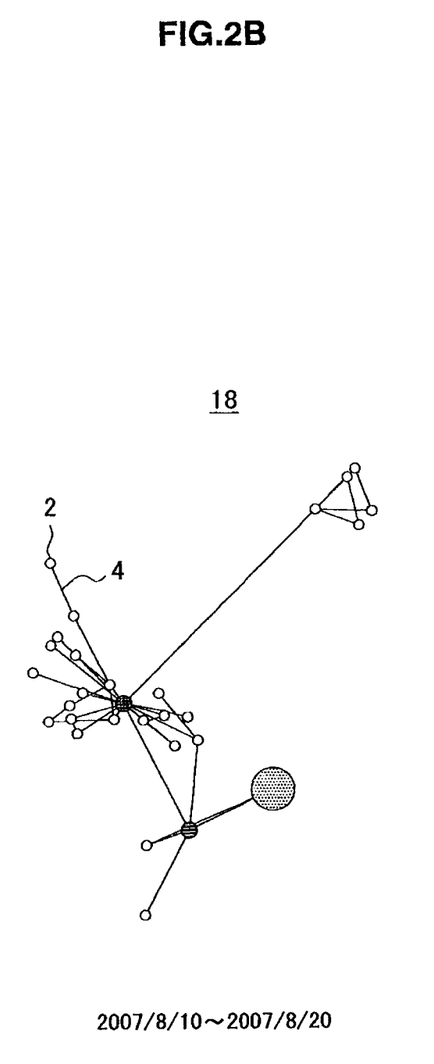
FIG. 2B is an explanatory view exemplifying an image of the network structure showing a change of SNS operation conditions.

FIG. 2A and FIG. 2B are explanatory views exemplifying images of a network structure showing a change of SNS operation conditions. In FIG. 2A, SNS operation conditions at predetermined times, for example, August 10, August 20 and August 30 of 2007 are chronologically displayed as images (network images) 12, 14, and 16 representing a mesh-type network structure with a registered user as a node 2 (a circle in FIG. 2A) and a relation between registered users as an edge 4 (lines in FIG. 2A). In FIG. 2B, a change of SNS operation conditions in a predetermined period, for example, August 10 to August 20 of 2007 is displayed as a network image 18 showing a difference of change of the network structure in the predetermined period.

The node 2 may represent all registered users registered with the SNS or registered users belonging to a specific group (community) formed with the SNS at a predetermined time.

The edge 4 represents a relation formed between registered users, for example, a friend relation formed between registered users, a relation leaving footsteps, a relation to write a comment, and a relation to transmit/receive messages at a predetermined time. Here, the friend relation is a relation formed by mutual recognition between registered users on a Web page (hereinafter, may be called simply as a page) (for example, a page where a diary of a registered user is made public) set up for each registered user. The relation leaving footsteps is a relation formed by leaving a browsing history between registered users. The relation to write a comment is a relation formed by writing a comment between registered users. The relation to transmit/receive messages is a relation formed by transmitting/receiving messages between registered users.

The node 2 and the edge 4 are represented by user information of registered users and relation information between registered users respectively. User information includes, for example, attribute information showing the name, position and the like of a registered user and registration time information showing the registration time of the registered user. As described above, relation information includes, for example, relation formation information showing a relation formed between registered users such as a friend relation and a relation leaving footsteps and relation formation time information showing the formation time of each relation.

The node 2 is displayed about the registered user corresponding to the node 2 in accordance with parameters such as the registration date/time, number (order) of other registered users with whom a relation is formed, number of comments written on a page of the registered user, number of times of accessing pages of other registered users, and number of times of the page of the registered user being accessed by other registered users. The node 2 is displayed by changing display attributes such as the size, color, and form of the node 2 and text on the node 2 in accordance with parameters described above.

The edge 4 is displayed about the relation corresponding to the edge 4 in accordance with parameters such as the type of relation (for example, a friend relation and a relation leaving footsteps), time of forming a relation, and strength of a relation. The strength of a relation is a parameter representing, for example, the number of messages transmitted/received between registered users. The edge 4 is displayed by changing display attributes such as the thickness, color, and line type of the edge 4 and text on the edge 4 in accordance with parameters described above.

In FIG. 2A and FIG. 2B, SNS operation conditions are displayed by taking the network images 12, 14, 16, and 18 (hereinafter, the network images may generically be referred to as a network image 10) as an example in which a registered user (for example, a user account) is represented as the node 2 and a friend relation (also referred to as a friend link or a link) as the edge 4. Then, on the network image 10, the color and size of the node 2 are each changed and displayed in accordance with the registration date/time and order of each registered user and the color of the edge 4 is changed and displayed in accordance with the time when a friend link is established.

In a description that follows, as shown in FIG. 2A and FIG. 2B, a case in which the network image 10 with a registered user as the node 2 and a friend link established between registered users as the edge 4 will be described as a display example of SNS operation conditions. However, a case in which the network image 10 with a relation other than a friend link established between registered users as the edge 4 can also be described in the same manner.

Accordingly, a user can accurately grasp a change of SNS operation conditions through the network image 10 represented as a chronological change or a difference of change. The user can grasp, for example, a relation between an increase/decrease of the number of registered users and that of the number of friend links, a relation between the registration date/time and an increase/decrease of the number of friend links, a relation between a specific registered user and an increase/decrease of the number of friend links, and each of the above relations in a specific period.

Figure 3:
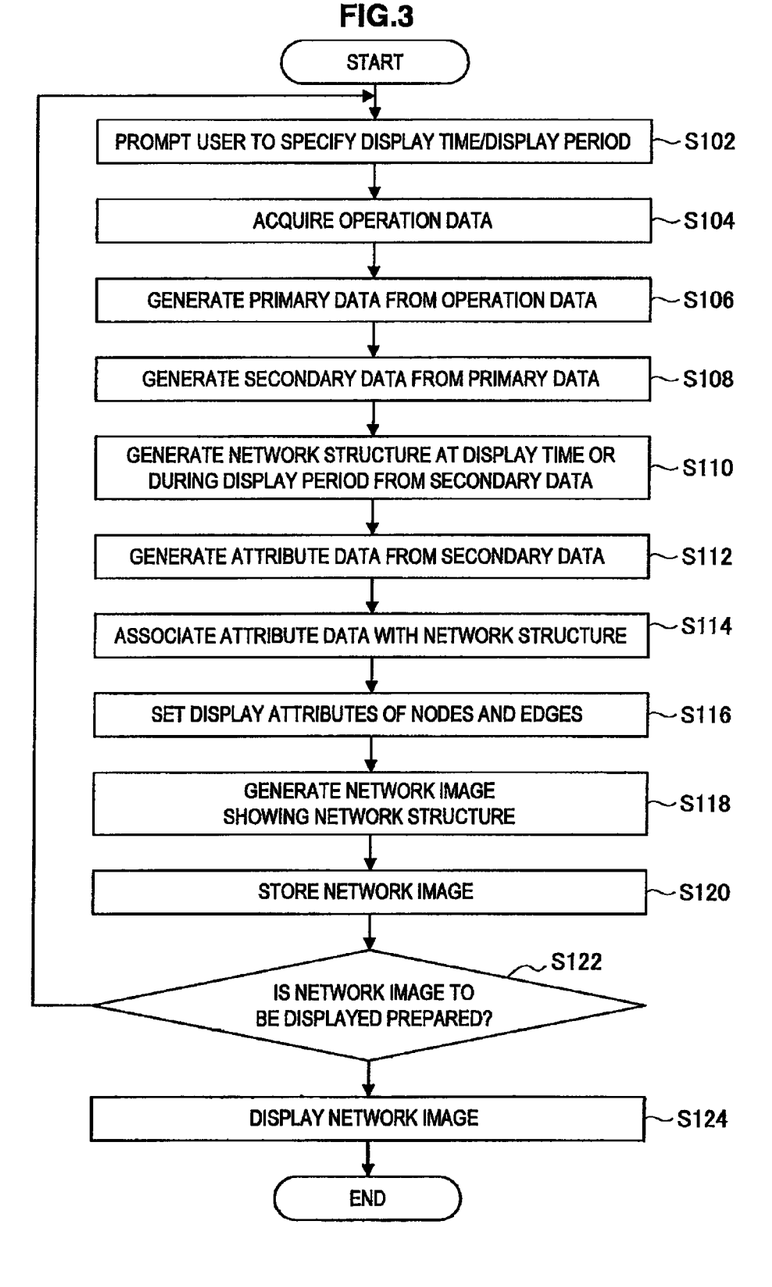
FIG. 3 is a flow diagram showing a processing method to a display network image shown in FIG. 2A or FIG. 2B.
Figure 4A:
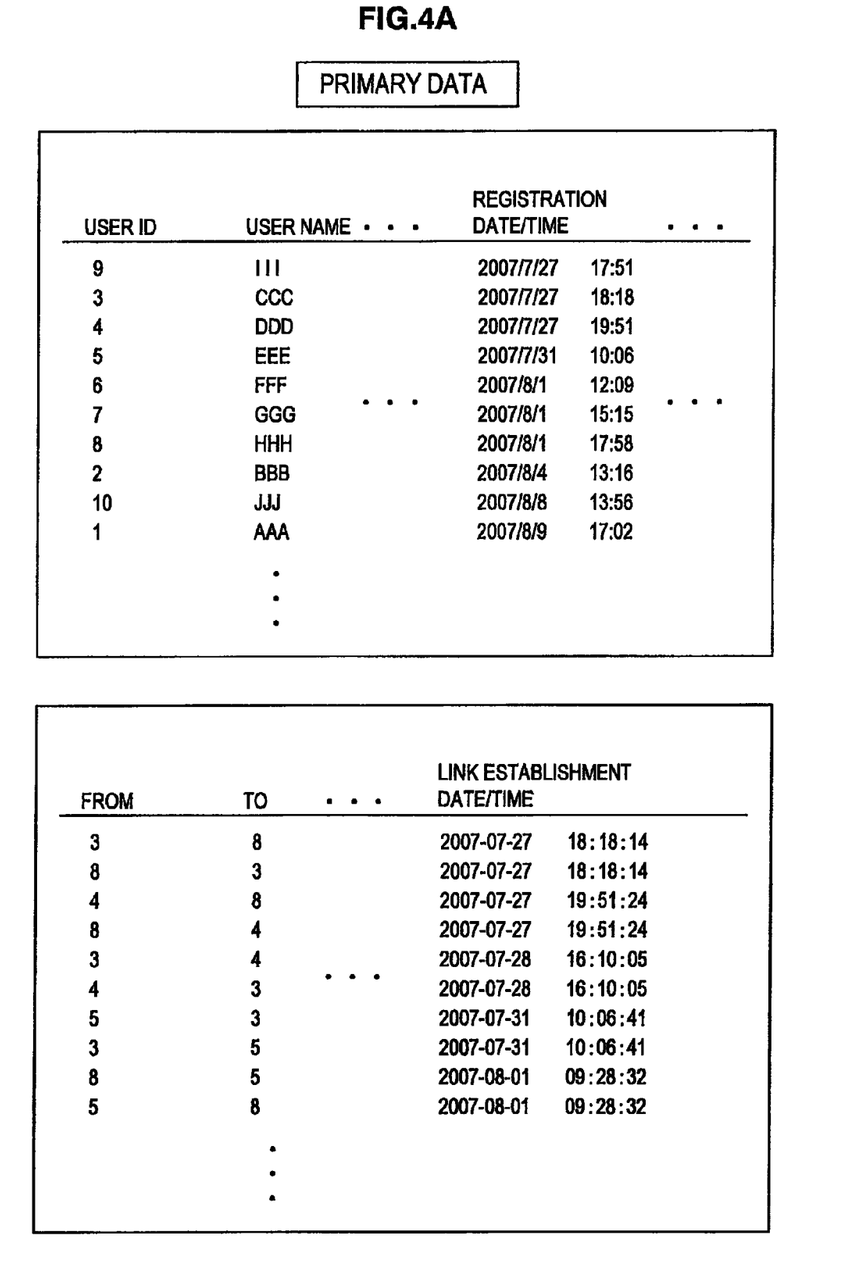
FIG. 4A is an explanatory view showing primary data generated from operation data.
Figure 4B:
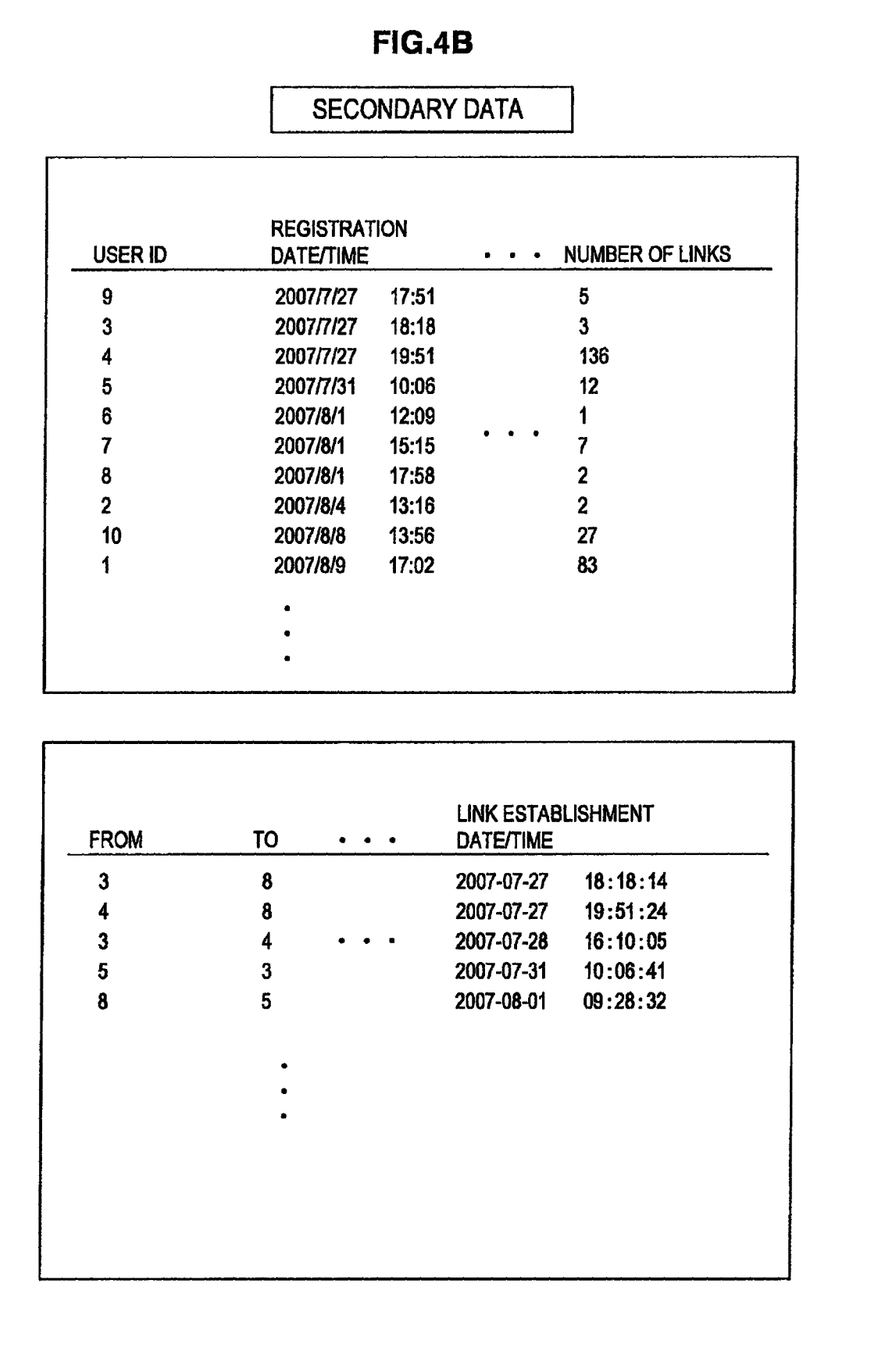
FIG. 4B is an explanatory view showing secondary data generated from the primary data.
Figure 5:
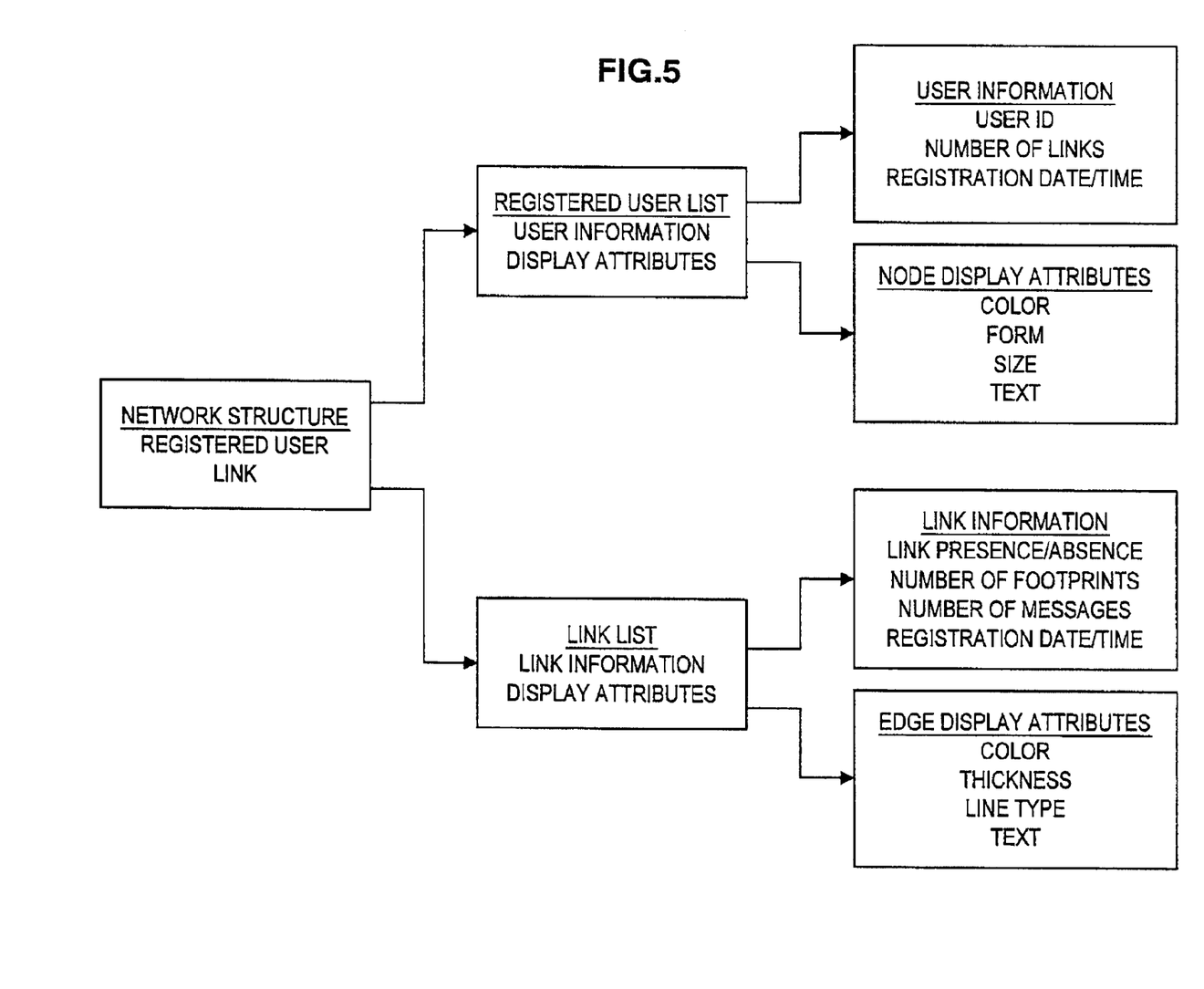
FIG. 5 is an explanatory view showing a network structure and data configurations of attribute (user attribute, link attribute) data associated with the network structure.

Next, the information processing method according to the present embodiment will be described with reference to FIG. 3 to FIG. 5. FIG. 3 is a flow diagram showing the information processing method to display a network image shown in FIG. 2A or FIG. 2B. FIG. 4A and FIG. 4B are explanatory views showing primary data generated from operation data and secondary data respectively. FIG. 5 is an explanatory view showing a network structure and data configurations of attribute (user attribute, link attribute) data associated with the network structure.

When processing starts, the terminal system prompts the user to selectively designate the display time or display period (step S102). If neither the display time nor display period is designated by the keyboard 110 or the mouse 112, the following processing is performed based on a preset display time or display period.

Here, the display time is designated as at least one time in a period (data management period) in which operation data is managed by the SNS system (for example, day n, month m, year l). The display time may be designated as a combination of a predetermined period (for example, day $n_1$, month $m_1$, year $l_1$ to day $n_2$, month $m_2$, year $l_2$) in the data management period and an interval (for example, every l years, every m months, or every n days) to divide the predetermined period. The display period is designated as a predetermined period from a first time to a second time (for example, day $n_3$, month $m_3$, year $l_3$ to day $n_4$, month $m_4$, year $l_4$) in the data management period.

If a single display time is designated or set, the image 10 representing a network structure showing relations formed between registered users at the designated or set time is displayed. If a plurality of times is designated or set, for example, as shown in FIG. 2A, the images 10 (for example, the network images 12, 14, and 16) representing a network structure showing relations formed between registered users at each designated or set time are chronologically displayed. Further, if a display period is designated or set, for example, as shown in FIG. 2B, the image 10 (for example, the network image 18) showing a change of network structure showing relations that have been formed between registered users in the designated or set display period, that is, a difference between the network structure at a first time and that at a second time is displayed.

First, the terminal system acquires operation data (S104). Operation data is managed in log format containing point of execution of processing and processing content by a database of the SNS system or the like. Here, the processing is various kinds of processing such as user registration processing and relation formation processing (for example, a friend relation, a relation of leaving footsteps, and a relation of transmitting/receiving messages) between registered users. Thus, operation data is acquired from the SNS system via the network interface 116 or the removable memory 122 based on the display time or display period. The acquired data may temporarily be stored in the RAM 106 or a buffer memory (not shown) or used in subsequent processing without being stored.

The terminal system generates primary data from the operation data (S106). For example, as shown in FIG. 4A, primary data such as the user ID, user name, and registration date/time of a registered user, the link source (from), link destination (to), and link establishment date/time of a friend link are generated from the operation data in log format. The generated primary data may temporarily be stored in a buffer memory or the like or used in subsequent processing without being stored.

The terminal system generates secondary data from the primary data (S108). Since the primary data contains information that is not necessary for subsequent processing or duplicate information, for example, as shown in FIG. 4B, the user ID, registration date/time, and number of links (order) of each registered user and the link source (from), link destination (to), and link establishment date/time of a friend link are generated as secondary data. Here, for example, the user ID and registration date/time of each registered user are contained in the primary data. The number of links is calculated from the link source (from), link destination (to), and link establishment date/time of friend links contained in the primary data for each registered user. The link source (from), link destination (to), and link establishment date/time of a friend link are generated from information about a friend link contained in the primary data. The generated secondary data is temporarily stored in the buffer memory or the like.

The terminal system generates a network structure (data) showing relations formed between registered users at the display time or relations that have been formed in the display period from the secondary data (S110). A network structure defines a structure of a network consisting of registered users and links and is generated by the CPU 102 (network structure generation unit) based on the secondary data in consideration of the registration date/time of each registered user and the link establishment date/time of each link. That is, a network structure showing relations formed between registered users at the display time is generated by extracting registered users registered before the display time and links established before the display time based on the registration date/time and link establishment date/time. Also, a network structure showing relations that have been formed between registered users in the display period is generated by extracting registered users registered in the display period and links established in the display period. The generated network structure is temporarily stored in the buffer memory or the like.

The terminal system generates attribute data (user attributes, link attributes) from the secondary data (S112). Here, user attributes and link attributes contain information corresponding to the aforementioned user information and link information respectively and displayed together with the network image 10 when necessary. The generated attribute data is temporarily stored in the buffer memory or the like.

The terminal system associates the user attributes and link attributes with the network structure (S114). The network structure and attribute (user attributes, link attributes) data are configured, for example, as shown in FIG. 5. Here, user attributes and link attributes of a corresponding registered user are associated with the node 2 and the edge 4 contained in the network structure showing relations formed between registered users at the display time or relations that have been formed in the display period. Data for association is temporarily stored in the buffer memory or the like.

The terminal system sets display attributes of the node 2 and the edge 4 (S116). Display attributes of the node 2 are set about the registered user corresponding to the node 2 by changing the color, size and the like of the node 2 in accordance with, for example, the registration date/time, order and the like. Display attributes of the edge 4 are set about a friend link corresponding to the edge 4 by changing the color and the like of the edge 4 in accordance with, for example, the link establishment date/time.

The terminal system generates the network image 10 representing the network structure (S118). The network image 10 is generated by the CPU 102 (network image generation unit) by applying the spring embedded model, a graphic layout algorithm such as Kamada and Kawai, or network display (visualization) tools described as related art to the generated network structure.

The terminal system stores the network image 10 consisting of the network structure at the display time (in the display period) in the RAM 106 or the like (S120). The terminal system determines whether the network images 10 corresponding to all display times or the network image 10 representing a difference corresponding to the display period is prepared (S122). If the corresponding network image 10 is not prepared, the other network images 10 is generated and stored by repeating processing at S110 to S120. In, on the other hand, all the corresponding network images 10 are prepared, the network images 10 are read from the RAM 106 or the like and the CPU 102 (network image display unit) causes the display 108 or the like to chronologically display the network images 10 corresponding to all display times or the network image 10 of a difference corresponding to the display period (S124).

When the network images 10 corresponding to a plurality of display times are displayed, the plurality of network images 10 at different display times may be displayed simultaneously or a predetermined number of images may automatically be switched at a time in accordance with the selection of a user.

Accordingly, a change of SNS operation conditions can accurately be grasped through the chronologically displayed network images 10. Further, a change of SNS operation conditions can accurately be grasped by displaying the network image 10 showing a change of the network structure in a predetermined period.

Figure 6A:
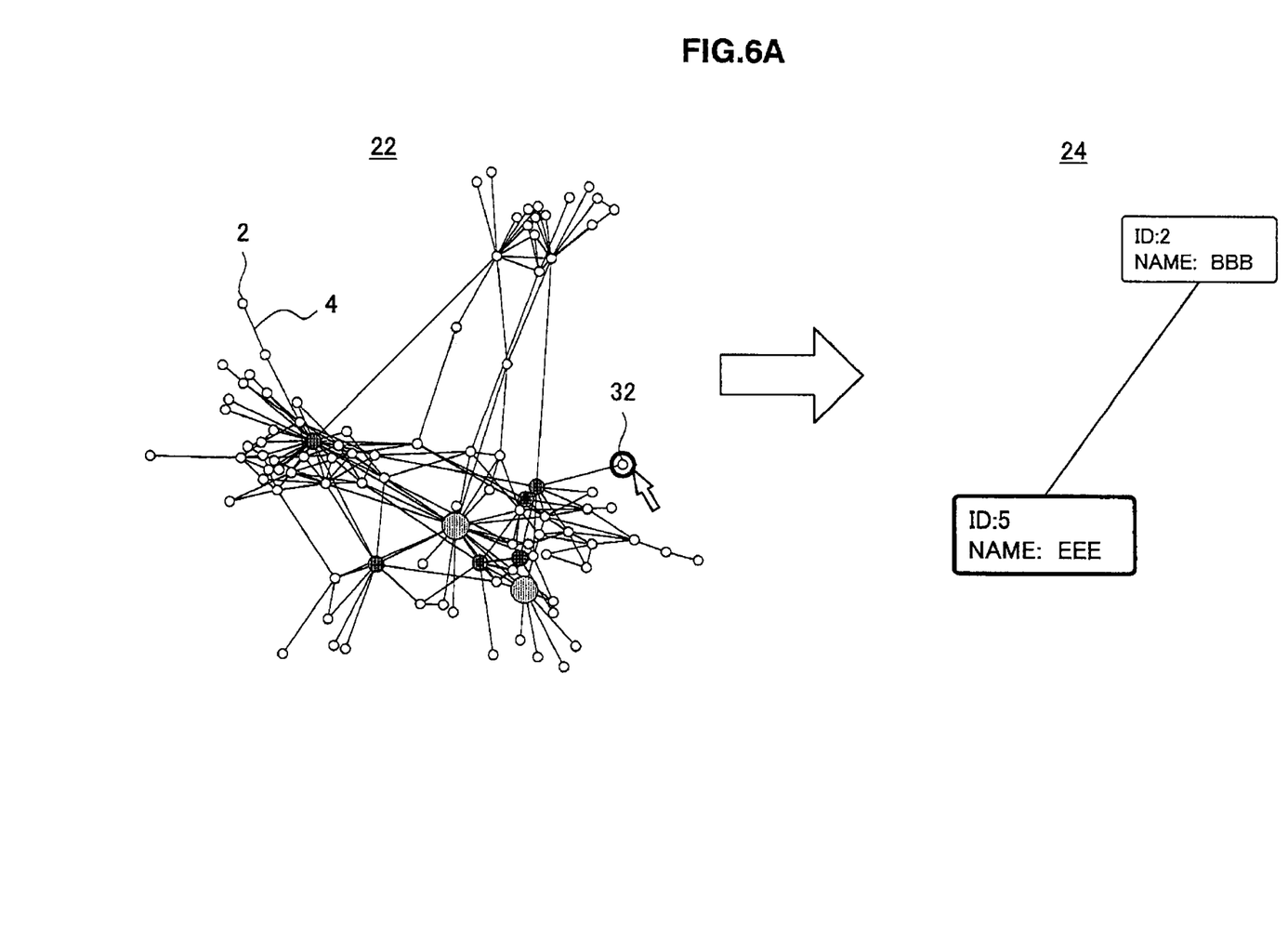
FIG. 6A is an explanatory view illustrating a display mode of a network image.
Figure 6B:
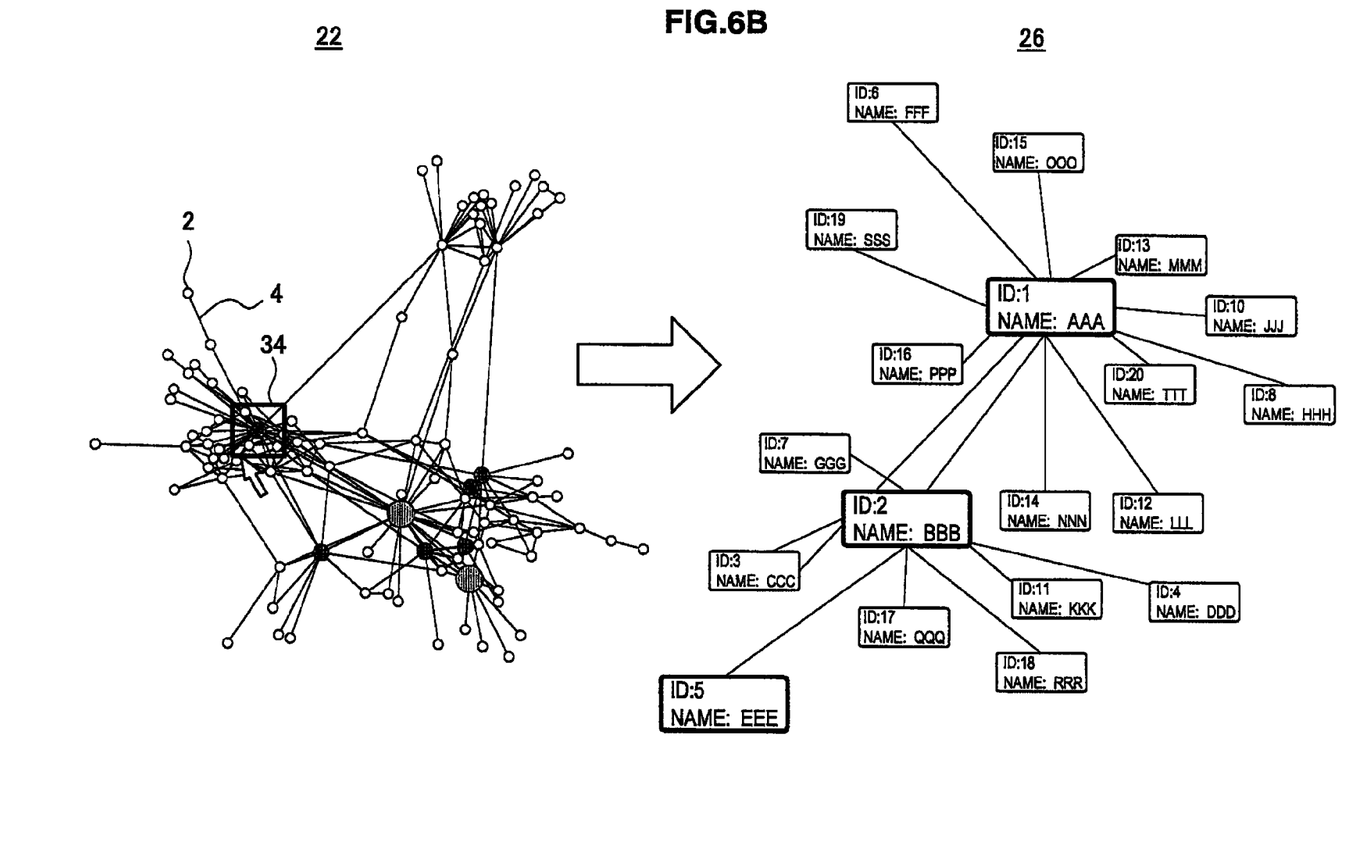
FIG. 6B is an explanatory view illustrating the display mode of the network image.

Next, the information processing method according to the present embodiment will be described in detail with reference to FIG. 6 to FIG. 8. FIG. 6A and FIG. 6B are explanatory views illustrating a display mode of a network image.

According to the information processing method in the present embodiment, the network image 10 is displayed in one of the two display modes or in both of the two display modes in accordance with the selection of a user. The two display modes consist of the total display mode that displays an entire network structure and the local display mode that displays a portion of a network structure.

In the example shown in FIG. 6A, a network image 22 with the node 2 as a registered user and the edge 4 as a link between registered users is displayed in total display mode. If, in this state, the local display mode is selected by selecting a specific node 32 on the network image 22 using an input device (not shown) such as the mouse 112 or a touch screen, a display is made in local display mode. A network image 24 about the selected specific node 32 containing user information (user ID, user name) of the corresponding registered user and that of another registered user linked to the relevant registered user is displayed in local display mode.

Here, the specific node 32 on the network image 22 is identified based on position information on the display screen input by the mouse 112 and coordinate information used to display the network image 22. Then, the network image 24 to display in local display mode is generated based on the network structure and attribute (user attributes, link attributes) data.

In the example shown in FIG. 6B, if the local display mode is selected by selecting a specific region 34 on the network image 22 in total display mode, a display is made in local display mode. The specific region 34 is designated, for example, by a so-called drag operation of the mouse 112. A network image 26 about a node set contained in the selected specific region 34 representing user information of the corresponding registered users and that of other registered users linked to the relevant registered users is displayed in local display mode. The method of identifying a region on the network image 22 and that of generating the network image 26 are the same as those in FIG. 6A and therefore, a description thereof is omitted.

The user can select the two display modes reciprocally. The network image 10 may be displayed in one of these modes in accordance of the user selection or in both display modes simultaneously.

Accordingly, a change of SNS operation conditions can efficiently be grasped by selecting the display mode according to purpose to display the network image 10 showing a change of the network structure as a whole or locally. Here, as an example of selecting the display mode according to purpose, an example in which after grasping a location of change in a network structure in total display mode, details around the location of change is grasped in local display mode can be cited. A change of SNS operation conditions can efficiently be grasped by displaying the network images 10 showing a change of the network structure as a whole and locally simultaneously.

Figure 7A:
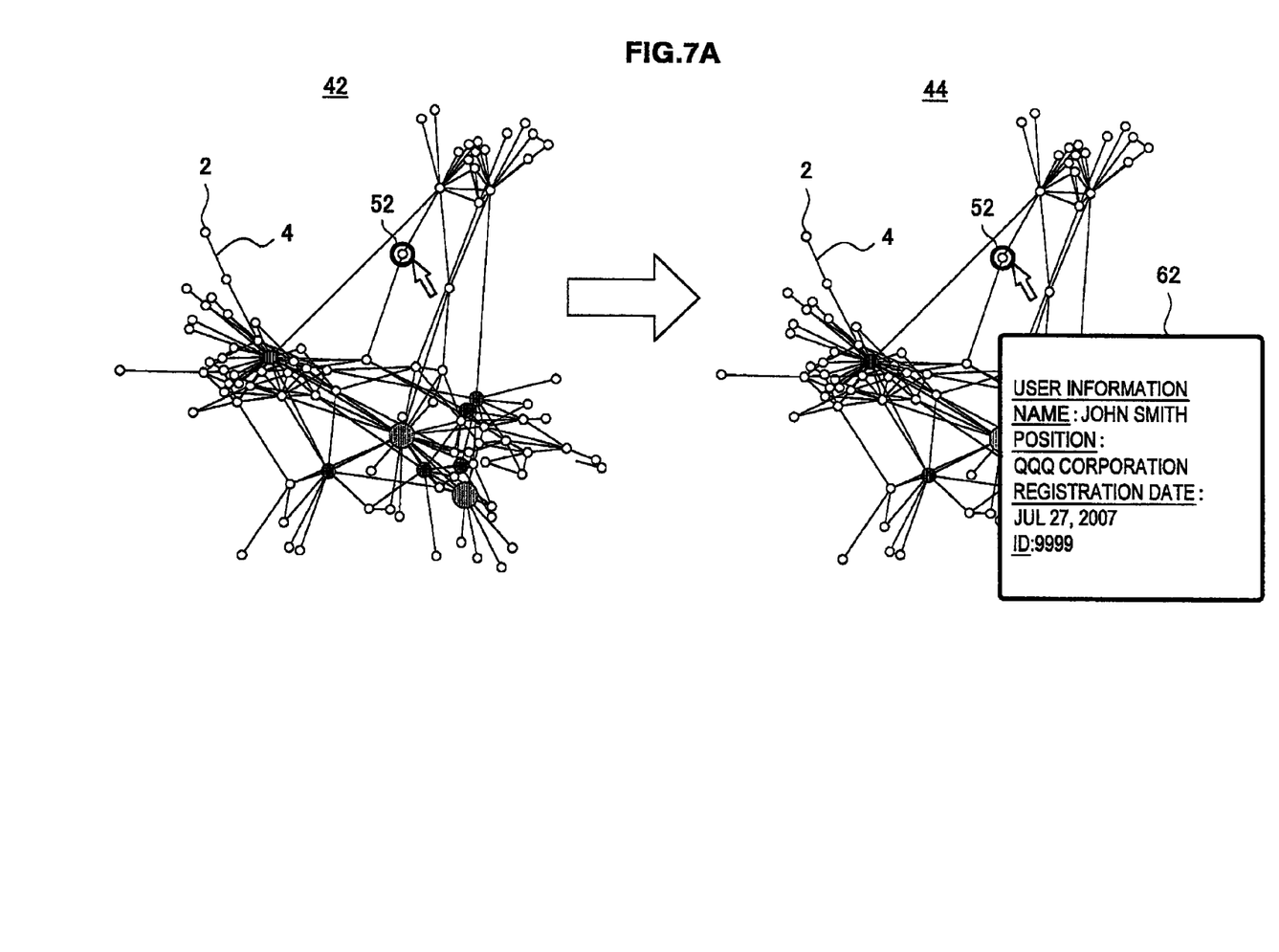
FIG. 7A is an explanatory view illustrating an information processing method in total display mode.
Figure 7B:
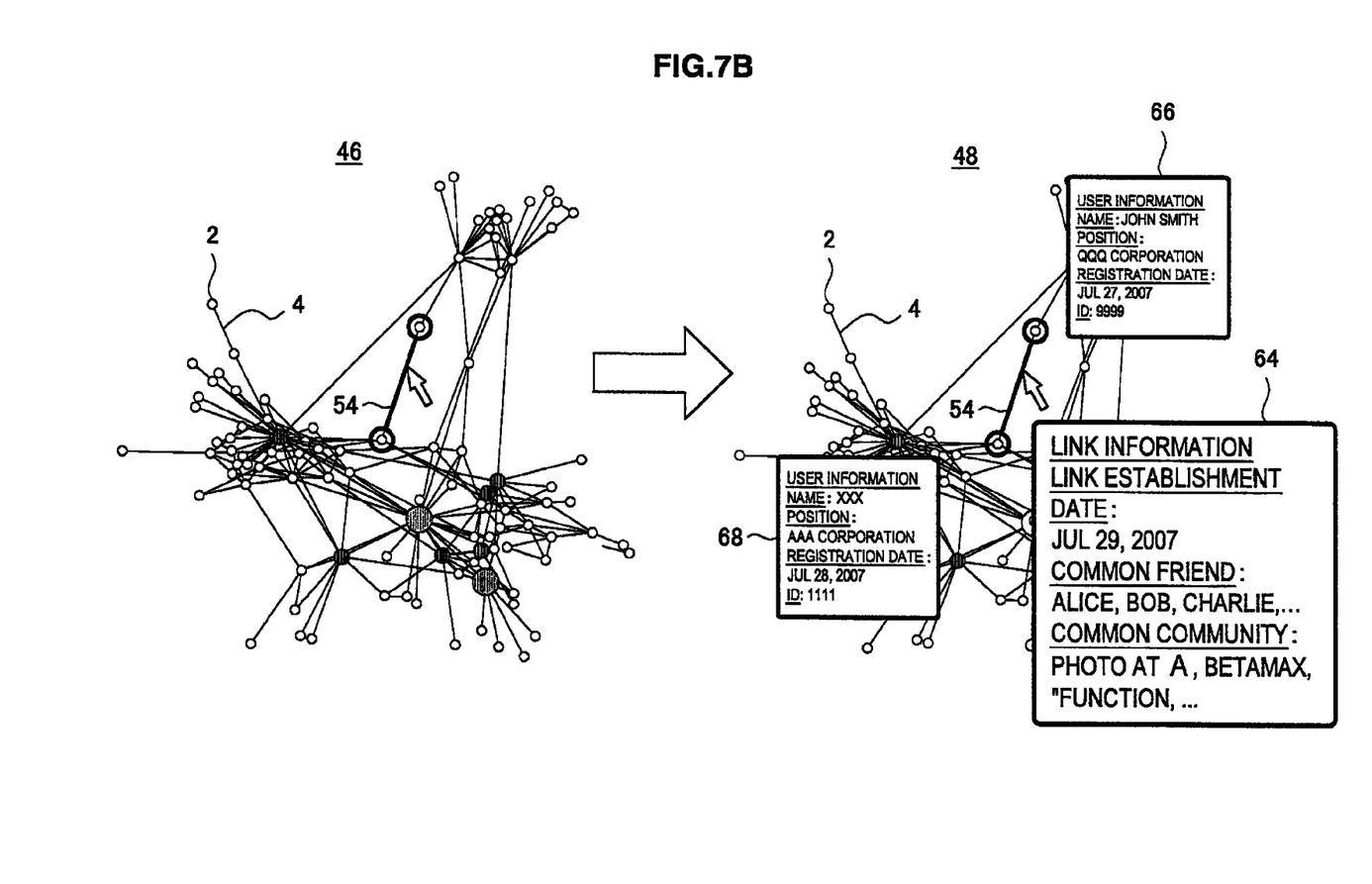
FIG. 7B is an explanatory view illustrating the information processing method in total display mode.

FIG. 7A and FIG. 7B are explanatory views illustrating the information processing method in total display mode.

In the example shown in FIG. 7A, if a specific node 52 on a network image 42 is selected by using a input device in total display mode, a network image 44 about the registered user corresponding to the selected specific node 52 containing user attribute data (the user ID, user name, position, and registration date/time) 62 is displayed. While the user attribute data 62 is displayed in a pop-up form in FIG. 7A, the user attribute data 62 may be displayed in other display forms.

In the example shown in FIG. 7B, if a specific edge 54 on a network image 46 is selected in total display mode, a network image 48 about the link corresponding to the selected specific edge 54 containing link attribute data 64 and user attribute data 66 and 68 of registered users linked by the link is displayed. As the link attribute data 64, the link establishment date/time, friends common to linked registered users, common groups (communities) and the like are displayed.

Here, the method of identifying the specific node 52 and the specific edge 54 on the network images 42 and 46 respectively is the same as that in FIG. 6A. Then, the network images 44 and 48 containing the user attribute data 62, 66, and 68 and the link attribute data 64 are generated based on the network structure and attribute (user attributes, link attributes) data.

Figure 8:
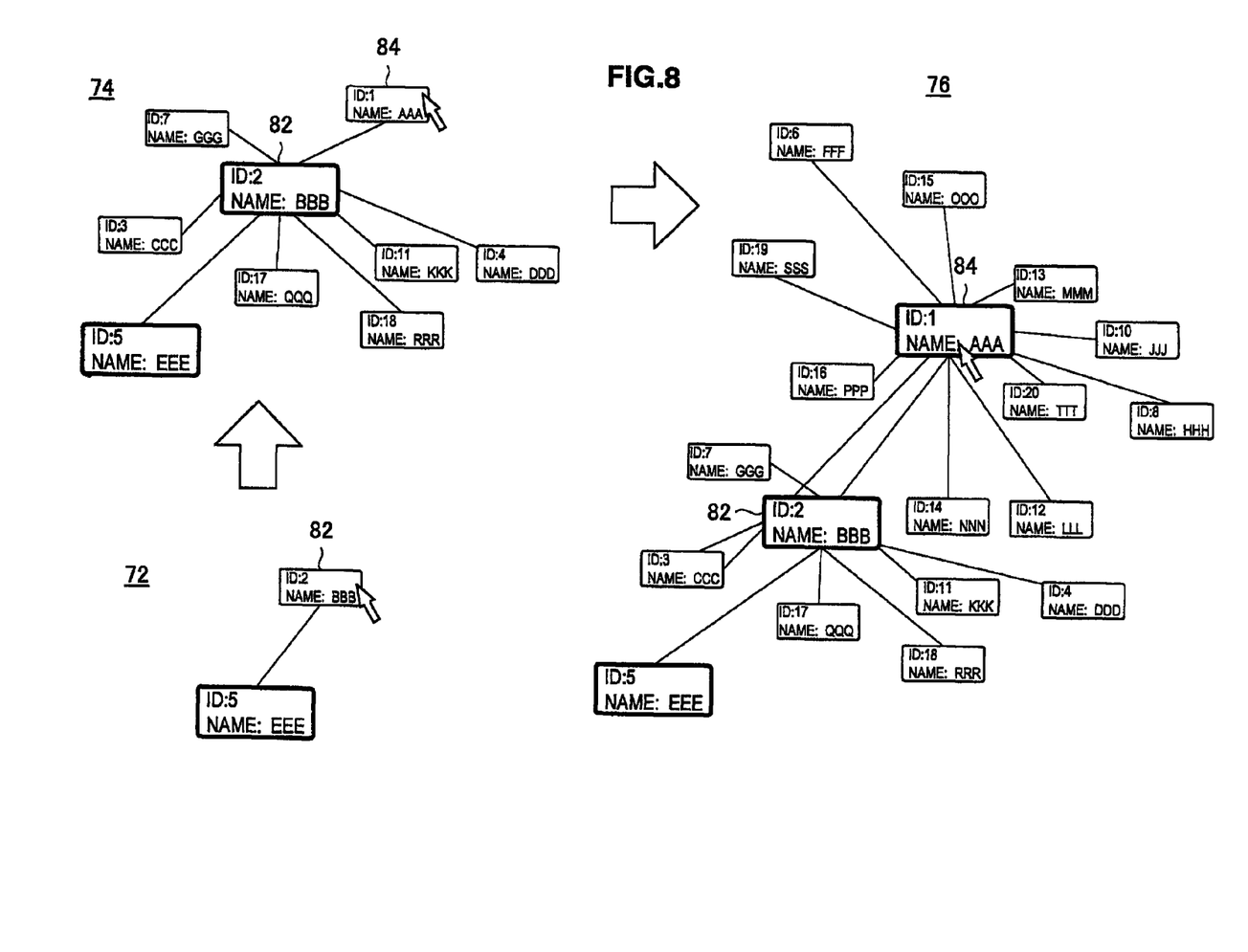
FIG. 8 is an explanatory view illustrating the information processing method in local display mode.

FIG. 8 is an explanatory view illustrating the information processing method in local display mode.

In the example shown in FIG. 8, if specific nodes 82 and 84 are selected on a network image 72 using an input device in local display mode, nodes and links of other registered users linked to the registered users corresponding to the selected specific nodes 82 and 84 are displayed. For example, if the node 82 corresponding to a first registered user (user ID 2) is selected, nodes of a group of second registered users (user IDs 1, 3, 4, 7, 11, 17, and 18) linked to the relevant registered user are displayed. Then, if the node 84 of a registered user (user ID 1) in the group of second registered users is selected, a group of third registered users (user IDs 6, 8, 10, 12, 13, 14, 15, 16, 19, and 20) linked to the relevant registered user are displayed.

Here, the method of identifying the specific nodes 82 and 84 on the network images 72, 74, and 76 is the same as that in FIG. 6A. Then, the network images 72, 74, and 76 in local display mode are generated based on the network structure and attribute (user attributes, link attributes) data.

According to the information processing methods shown in FIG. 7A, FIG. 7B, and FIG. 8, information to grasp a change of SNS operation conditions can efficiently be acquired by selecting a specific node or a specific edge on a network image. Particularly, according to the information processing method shown in FIG. 8, relations between registered users can searchingly be browsed and therefore, a change of SNS operation conditions can be grasped based on relations with a specific user.

According to the information processing method in the present embodiment, as described above, network structures showing relations (friend links) formed between registered users at a plurality of predetermined times are generated based on user information containing registration time information and relation information containing relation formation time information. Then, the network images 10 representing the generated network structures with a registered user as the node 2 and a link established between registered users as the edge 4 are chronologically displayed. Accordingly, a change of SNS operation conditions can accurately be grasped through the chronologically displayed network images 10.

In the above description, a case in which an image representing a network structure showing relations formed between registered users for a single SNS is described. However, images representing network structures showing relations formed between registered users of each SNS of a plurality of SNS may simultaneously be displayed. Accordingly, changes of SNS operation conditions can efficiently be compared through network images chronologically displayed for the plurality of SNS.

The present application contains subject matter related to that disclosed in Japanese Priority Patent Application JP 2008-131253 filed in the Japan Patent Office on May 19, 2008, the entire content of which is hereby incorporated by reference.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a network structure generation unit, implemented by a processor, that generates a network structure showing relations formed between registered users at one or more predetermined times based on user information containing attribute information showing attributes of the registered user registered with a social networking service (SNS) and registration time information showing a registration time of the registered user, and relation information containing relation formation information showing a relation formed between the registered users on the SNS and relation formation time information showing a relation formation time;
   a network image generation unit, implemented by the processor, that generates a network image representing the generated network structure with the registered user as a node and a relation formed between the registered users as an edge;
   a network image display unit that chronologically displays the generated network images at the one or more predetermined times; and
   a display mode selection unit for selecting a display mode of the network image,
   wherein:
      in response to a selection of the display mode, the network image generation unit generates a network image corresponding to a total display mode in which all registered users contained in the generated network structure and relations formed between all the registered users are displayed or a local display mode in which a specific registered user and relations formed by the specific registered user are displayed, and
      the network image display unit displays the generated network image corresponding to the total display mode or the local display mode.

2. The information processing apparatus according to claim 1, wherein the network image generation unit generates a network image corresponding to both the total display mode and the local display mode, and
   the network image display unit simultaneously displays both the generated network images.

3. The information processing apparatus according to claim 1, further comprising a node/edge selection unit for selecting a node or an edge on the network image displayed in the total display mode, wherein
   the network image generation unit generates, when a node is selected, a network image containing attribute information of a registered user corresponding to the selected node and, when an edge is selected, a network image containing relation information of a relation corresponding to the selected edge and attribute information of each registered user corresponding to nodes arranged at both ends of the selected edge, and
   the network image display unit displays the generated network image.

4. The information processing apparatus according to claim 1, further comprising a node/edge selection unit for selecting a node or an edge on the network image displayed in the local display mode, wherein
   the network image generation unit generates a network image containing attribute information of a registered user corresponding to a node together with the node and, when the node is selected, generates a network image containing edges showing relations formed between the registered user corresponding to the selected node and other registered users and nodes showing the other registered users, and
   the network image display unit displays the generated network image.

5. The information processing apparatus according to claim 1, further comprising a period designation unit for designating a predetermined period, wherein
- the network structure generation unit generates a network structure showing relations formed between registered users in the predetermined period,
- the network image generation unit generates a network image representing the generated network structure, and
- the network image display unit displays the generated network image.

6. The information processing apparatus according to claim 1, wherein the network image generation unit changes display attributes of a node corresponding to a registered user and edges based on user information and relation information corresponding to the registered user.

7. The information processing apparatus according to claim 1, wherein network images representing network structures showing relations formed between registered users of a plurality of SNS are simultaneously displayed.

8. An information processing method, implemented by a processor, comprising the steps of:
- generating, by the processor, a network structure showing relations formed between registered users at one or more predetermined times based on user information containing attribute information showing attributes of the registered user registered with a social networking service (SNS) and registration time information showing a registration time of the registered user, and relation information containing relation formation information showing a relation formed between the registered users on the SNS and relation formation time information showing a relation formation time;
- generating, by the processor, a network image representing the generated network structure with the registered user as a node and a relation formed between the registered users as an edge;
- displaying chronologically the generated network images at the one or more predetermined times;
- receiving a selection of a display mode of the network image;
- in response to the selection of the display mode, generating, by the processor, a network image corresponding to a total display mode in which all registered users contained in the generated network structure and relations formed between all the registered users are displayed or a local display mode in which a specific registered user and relations formed by the specific registered user are displayed; and
- displaying the generated network image corresponding to the total display mode or the local display mode.

9. A non-transitory computer readable medium encoded with a program that causes a computer to execute an information processing method, comprising the steps of:
- generating a network structure showing relations formed between registered users at one or more predetermined times based on user information containing attribute information showing attributes of the registered user registered with a social networking service (SNS) and registration time information showing a registration time of the registered user, and relation information containing relation formation information showing a relation formed between the registered users on the SNS and relation formation time information showing a relation formation time;
- generating a network image representing the generated network structure with the registered user as a node and a relation formed between the registered users as an edge;
- causing a display device to chronologically display the generated network images at the one or more predetermined times;
- receiving a selection of a display mode of the network image;
- in response to a selection of the display mode, generating, by the processor, a network image corresponding to a total display mode in which all registered users contained in the generated network structure and relations formed between all the registered users are displayed or a local display mode in which a specific registered user and relations formed by the specific registered user are displayed; and
- causing the display device to display the generated network image corresponding to the total display mode or the local display mode.

* * * * *